(12) United States Patent
Mizuno et al.

(10) Patent No.: US 11,977,048 B2
(45) Date of Patent: May 7, 2024

(54) ODOR SENSOR AND ODOR SENSING METHOD

(71) Applicant: HAMAMATSU PHOTONICS K.K., Hamamatsu (JP)

(72) Inventors: Seiichiro Mizuno, Hamamatsu (JP); Hiroo Yamamoto, Hamamatsu (JP); Sho Morita, Hamamatsu (JP); Toshiki Wakamori, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 242 days.

(21) Appl. No.: 17/605,263

(22) PCT Filed: Feb. 13, 2020

(86) PCT No.: PCT/JP2020/005625
§ 371 (c)(1),
(2) Date: Oct. 21, 2021

(87) PCT Pub. No.: WO2020/240942
PCT Pub. Date: Dec. 3, 2020

(65) Prior Publication Data
US 2022/0196593 A1 Jun. 23, 2022

(30) Foreign Application Priority Data
May 31, 2019 (JP) ................. 2019-102692

(51) Int. Cl.
*G01N 27/333* (2006.01)
*G01N 27/414* (2006.01)

(52) U.S. Cl.
CPC ....... *G01N 27/333* (2013.01); *G01N 27/4141* (2013.01)

(58) Field of Classification Search
USPC .......................................... 205/789; 73/31.05
See application file for complete search history.

(56) References Cited

U.S. PATENT DOCUMENTS 8,912,580 B2 * 12/2014 Milgrew .............. C12Q 1/6869
257/253
2012/0096928 A1 * 4/2012 Occhipinti ......... G01N 27/4141
73/31.06

(Continued)

FOREIGN PATENT DOCUMENTS

CN      1478201 A     2/2004
CN    102866181 A     1/2013

(Continued)

OTHER PUBLICATIONS

International Preliminary Report on Patentability dated Dec. 9, 2021 for PCT/JP2020/005625.

(Continued)

*Primary Examiner* — Clayton E. LaBalle
*Assistant Examiner* — Warren K Fenwick
(74) *Attorney, Agent, or Firm* — Faegre Drinker Biddle & Reath LLP

(57) ABSTRACT

A smell sensor includes an ion sensor having a sensitive film, a substance adsorption film disposed on the sensitive film and configured to adsorb a smell substance to be detected, and an electrode configured to apply a reference voltage to the substance adsorption film. The substance adsorption film is in a state of releasing a proton in response to absorbing the smell substance.

13 Claims, 10 Drawing Sheets

(56) References Cited

U.S. PATENT DOCUMENTS

| | | | |
|---|---|---|---|
| 2012/0325683 A1* | 12/2012 | Milgrew | G01N 27/414 |
| | | | 205/789 |
| 2014/0200842 A1 | 7/2014 | Dasai et al. | |
| 2017/0173262 A1* | 6/2017 | Veltz | G16H 20/17 |
| 2021/0262975 A1* | 8/2021 | Wakamori | G01N 33/0031 |
| 2022/0260519 A1* | 8/2022 | Mizuno | G01N 33/0031 |

FOREIGN PATENT DOCUMENTS

| | | | |
|---|---|---|---|
| CN | 103890577 A | 6/2014 | |
| CN | 104833701 A | 8/2015 | |
| CN | 108139344 A | 6/2018 | |
| JP | 2009-533674 A | 9/2009 | |
| JP | 2012-215448 A | 11/2012 | |
| JP | 2018-081105 A | 5/2018 | |
| JP | 2018-535421 A | 11/2018 | |
| WO | WO-2006/025481 A1 | 3/2006 | |
| WO | WO-2007/119229 A1 | 10/2007 | |
| WO | WO-2017/089380 A1 | 6/2017 | |
| WO | WO-2019/131564 A1 | 7/2019 | |

OTHER PUBLICATIONS

Pandey, Sadanand, "Highly sensitive and selective chemiresistor gas/vapor sensors based on polyaniline nanocomposite: A comprehensive review," Journal of Science: Advanced Materials and Devices, Oct. 18, 2016, pp. 431-453.

Shinmyo, Naoya et al., "Gas Distribution Imaging by Charge-Transfer-Type Sensor Arrays with Polyaniline Sensitive Layer," Extended Abstracts of the 64th JSAP Spring Meeting, 2017, p. 11-330.

Tokyo Metropolitan Industrial Technology Research Institute [online], "Imparting Conductivity by Proton Injection into Polyaniline," Tiri News 2010, 2010, vol. 046, pp. 4-5.

* cited by examiner

ODOR SENSOR AND ODOR SENSING METHOD

TECHNICAL FIELD

The present disclosure relates to a smell sensor and a smell sensing method.

BACKGROUND ART

The sensor disclosed in Non-Patent Document 1 is known as a smell sensor having sensitivity to a smell. In the above sensor, a polyaniline sensitive film (a smell substance adsorption film) is formed on an ion sensitive film ($Si_3N_4$) of a so-called charge transfer type pH image sensor. Non-Patent Document 1 describes that gas detection (smell detection) is performed based on a change in the relative dielectric constant of a polyaniline sensitive film caused by gas exposure to the polyaniline sensitive film.

CITATION LIST

Non-Patent Document

[Non-Patent Document 1] Naoya Shinmyo, Tatsuya Iwata, Kenichi Hashizume, Shunichiro Kuroki, Kazuaki Sawada (2017), Gas distribution imaging by charge transfer type sensor arrays using polyaniline sensitive film, 64th JSAP Spring Meeting, 16p-416-6.

SUMMARY OF INVENTION

Technical Problem

However, the relative dielectric constant of the substance adsorption film may not be changed by gas exposure. Even when the relative dielectric constant of the substance adsorption film changes due to gas exposure, there is a possibility that the detection sensitivity of the smell substance can be improved by focusing on factors other than the change in the relative dielectric constant of the substance adsorption film.

An object of one aspect of the present disclosure is to provide a smell sensor and a smell detection method capable of suitably detecting a smell substance.

Solution to Problem

A smell sensor according to an aspect of the present disclosure includes an ion sensor having an ion sensitive portion, a substance adsorption film disposed on the ion sensitive portion and configured to adsorb a smell substance to be detected, and an electrode configured to apply a reference voltage to the substance adsorption film. The substance adsorption film is in a state of releasing a proton in response to adsorbing the smell substance.

In the above-mentioned smell sensor, the substance adsorption film is in a state of releasing proton when the smell substance is adsorbed. Accordingly, when the substance adsorption film adsorbs the smell substance, the ion sensitive portion can sense a change in electrical characteristics caused by proton release. In addition, since the reference voltage is applied to the substance adsorption film by the electrode, a slight change in electrical characteristics from a stable state (that is, a state in which the smell substance is not adsorbed to the substance adsorption film and the reference voltage is applied to the substance adsorption film) can be detected by the ion sensor. Therefore, according to the smell sensor, the smell substance can be suitably detected by utilizing the proton release phenomenon of the substance adsorption film.

The substance adsorption film may include polyaniline in an emeraldine-salt state. According to this configuration, a substance adsorption film that releases a proton when a smell substance is adsorbed can be suitably formed of polyaniline.

The ion sensitive portion may be configured to change a potential of the ion sensitive portion in response to a change in ion concentration in a vicinity of the ion sensitive portion due to proton release from the substance adsorption film. When the substance adsorption film adsorbs the smell substance, it is considered that proton release from the substance adsorption film occurs to change the ion concentration in the vicinity of the ion sensitive portion. That is, it is considered that the proton released from the substance adsorption film (or the smell substance ionized by the proton) stays in the vicinity of the ion sensitive portion, so that the ion concentration in the vicinity of the ion sensitive portion increases. According to the above configuration, such a change in the ion concentration can be detected as a change in the potential of the ion sensitive portion. Furthermore, the change in the ion concentration in the vicinity of the ion sensitive portion tends to occur more reliably than the change in the dielectric constant of the substance adsorption film. Therefore, according to the above configuration, the smell substance can be detected more accurately and earlier than in the case where the smell substance is detected based on the change in the relative dielectric constant of the substance adsorption film.

The smell sensor may further include a detector configured to detect the smell substance by monitoring an output value of the ion sensor in accordance with a potential of the ion sensitive portion and detecting a change in the output value of the ion sensor in accordance with a potential change of the ion sensitive portion. According to the above configuration, the smell substance can be immediately detected by the detector.

The substance adsorption film may be fibrous or porous. According to this configuration, the smell substance can pass through the substance adsorption film and reach the vicinity of the ion sensitive portion. Accordingly, the proton can be released from the substance adsorption film in the vicinity of the ion sensitive portion, and the ion sensitive portion can suitably sense a change in the ion concentration caused by the proton release. As a result, the smell substance can be suitably detected.

A thickness of the substance adsorption film in a facing direction in which the ion sensitive portion and the substance adsorption film face each other may be 5 µm or less. By thinly forming the substance adsorption film on the ion sensitive portion, it is possible to make it easy for the smell substance to reach the vicinity of the ion sensitive portion.

The smell sensor may further include a passivation layer provided to cover the ion sensor. The substance adsorption film may be provided to cover the passivation layer. The passivation layer may be provided with an opening exposing the ion sensitive portion to the outside. The ion sensitive portion may be in contact with the substance adsorption film through the opening. The substance adsorption film may be provided along a shape of the opening. According to this configuration, when the ion sensitive portion is disposed at a recessed position in the opening of the passivation layer, the thickness of the substance adsorption film provided on the ion sensitive portion can be effectively reduced. This makes it easier for the smell substance to reach the vicinity of the ion sensitive portion.

According to an aspect of the present disclosure, there is provided a smell detection method using a smell sensor including an ion sensor having an ion sensitive portion and a substance adsorption film disposed on the ion sensitive portion and configured to adsorb a smell substance to be detected. The smell detection method includes a step of monitoring an output value of the ion sensor in accordance with a potential of the ion sensitive portion in a state where a reference voltage is applied to the substance adsorption film, a step in which the substance absorption film releases a proton in response to adsorbing the smell substance, a step in which the ion sensitive portion changes a potential of the ion sensitive portion in response to a change in ion concentration in a vicinity of the ion sensitive portion due to proton release from the substance adsorption film, and a step of detecting the smell substance by detecting a change in an output value of the ion sensor in accordance with a potential change of the ion sensitive portion.

In the above-described smell detection method, a slight change in electrical characteristics (change in ion concentration in the vicinity of the ion sensitive portion) from a stable state in which a reference voltage is applied to the substance adsorption film can be detected by monitoring the output value of the ion sensor. Further, when the substance adsorption film adsorbs the smell substance, the proton release from the substance adsorption film occurs, so that the ion concentration in the vicinity of the ion sensitive portion changes. According to the smell detection method, the smell substance can be suitably detected by detecting such a change in the ion concentration based on the output value of the ion sensor.

Advantageous Effects of Invention

According to an aspect of the present disclosure, a smell sensor and a smell detection method capable of suitably detecting a smell substance may be provided.

DESCRIPTION OF EMBODIMENTS

Figure 1:
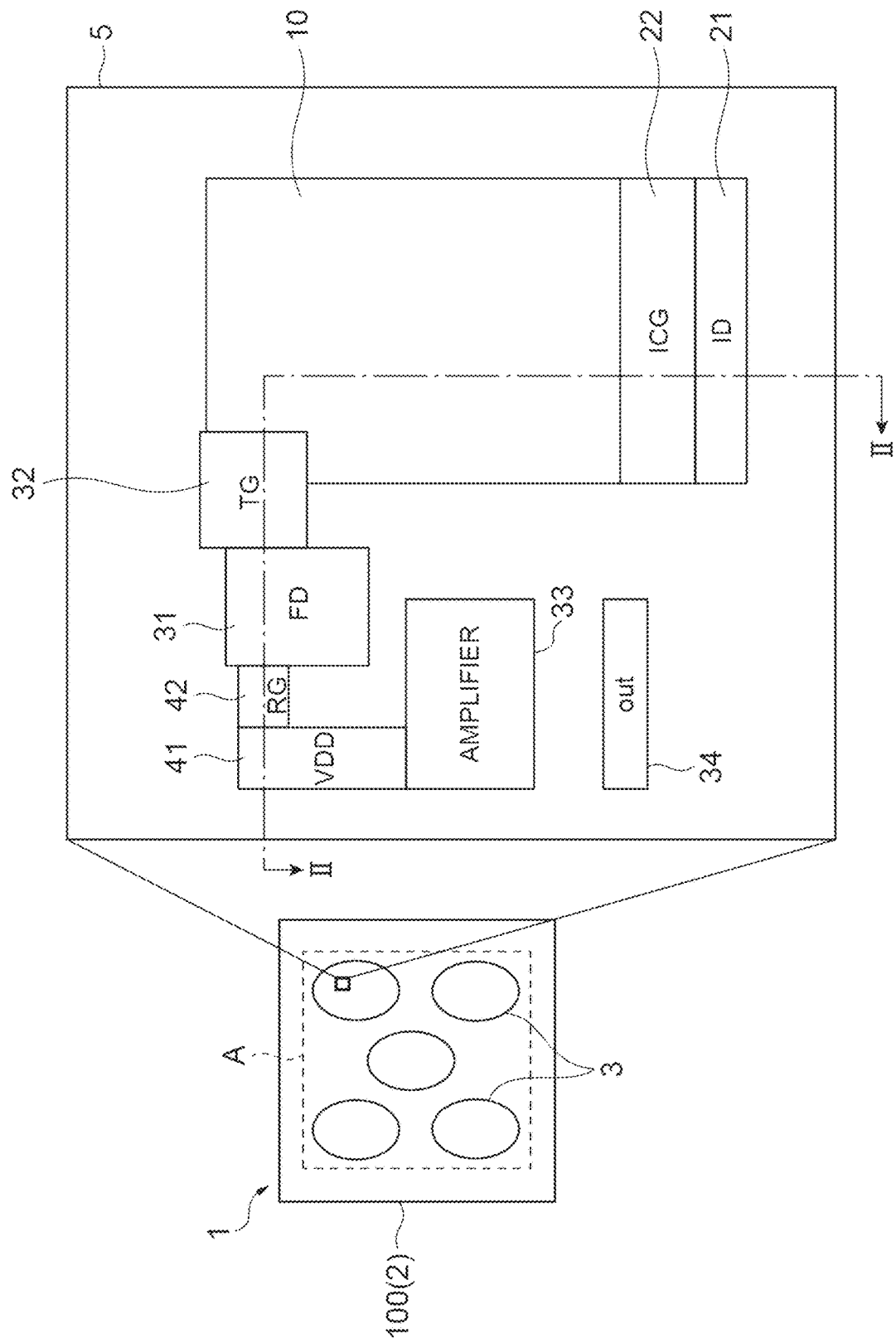
FIG. 1 is a schematic plan view of the smell sensor of a first embodiment.

Hereinafter, embodiments of the present disclosure will be described in detail with reference to the accompanying drawings. In the description of the drawings, the same reference numerals are used for the same or equivalent element, and redundant description is omitted.

First Embodiment

FIG. 1 is a schematic plan view of the smell sensor 1 of the first embodiment. As shown in FIG. 1, the smell sensor 1 includes an ion sensor 2, a plurality of (five in this case) substance adsorption films 3 provided on the ion sensor 2, an electrode 4 for applying a reference voltage to the substance adsorption films 3, and a detector 6.

The ion sensor 2 is a sensor in which a plurality of detection units 5 arranged two-dimensionally are formed on a semiconductor substrate 100. The ion sensor 2 is a so-called charge transfer type CMOS image sensor. The plurality of detection units 5 are two-dimensionally arranged in a pixel formation region A provided on a chip of the ion sensor 2 (in the present embodiment, a rectangular region provided in a central portion of the chip) in M rows and N columns (for example, 256 rows and 256 columns), to form a pixel array. M and N are integers of 2 or more. One detection unit 5 correspond to one detection unit (pixel). The size (pixel size) of one detection unit 5 is, for example, 30 μm×30 μm.

Each substance adsorption film 3 is disposed (formed) in the pixel formation region A so as to extend over a plurality of detection units 5. The substance adsorption film 3 is in a state having a property of releasing a proton in response to adsorbing a smell substance to be detected. Here, the "smell" is something that stimulates the olfactory sense of a living thing such as a human being or an animal, and the "smell substance" is a chemical substance that causes the smell (for example, a substance in which a specific single molecule or a specific group of molecules are assembled at a predetermined concentration). For example, the substance adsorption film 3 is a film in a state in which a proton is injected in advance so as to cause a reaction of proton release (deprotonation) when a smell substance is adsorbed. The proton implantation can be performed by a technique such as chemical polymerization, electropolymerization, or ion implantation, for example, as described in Reference 1 below.

(Reference 1: Imparting conductivity to polyaniline by proton injection, Tiri News 2010 vol. 046, February 2010)

In the present embodiment, as an example, the substance adsorption film 3 is a polyaniline film containing polyaniline in an emeraldine-salt state. The smell substance to be detected is, for example, ammonia, nitrogen oxide, or the like. For example, as described in Reference 2 below, polyaniline in the form of emeraldine-salt has an "$N^+$—H" moiety. Then, when the above-described smell substance (for example, ammonia gas or the like) is exposed to the polyaniline in the emeraldine-salt state, ammonia ($NH_3$) extracts proton ($H^+$) from the polyaniline in the emeraldine-salt state and becomes ammonia ion ($NH_4^+$). Due to the proton release, the polyaniline in the form of an emeraldine-salt is converted into the form of an emeraldine-base. As a result, the hole density of the polyaniline film decreases and the resistance value increases.

(Reference 2: Highly sensitive and selective chemiresistor gas/vapor sensors based on polyaniline nanocomposite: A comprehensive review (2016))

Among the detection units 5 arranged in the pixel formation region A, the detection unit 5 provided with the substance adsorption film 3 functions as a unit detection element capable of detecting the smell. The substance adsorption film 3 may be provided in the entire pixel formation region A (i.e., all the detection units 5 arranged in the pixel formation region A), or there may be a detection unit 5 on which the substance adsorption film 3 is not provided.

Figure 2:
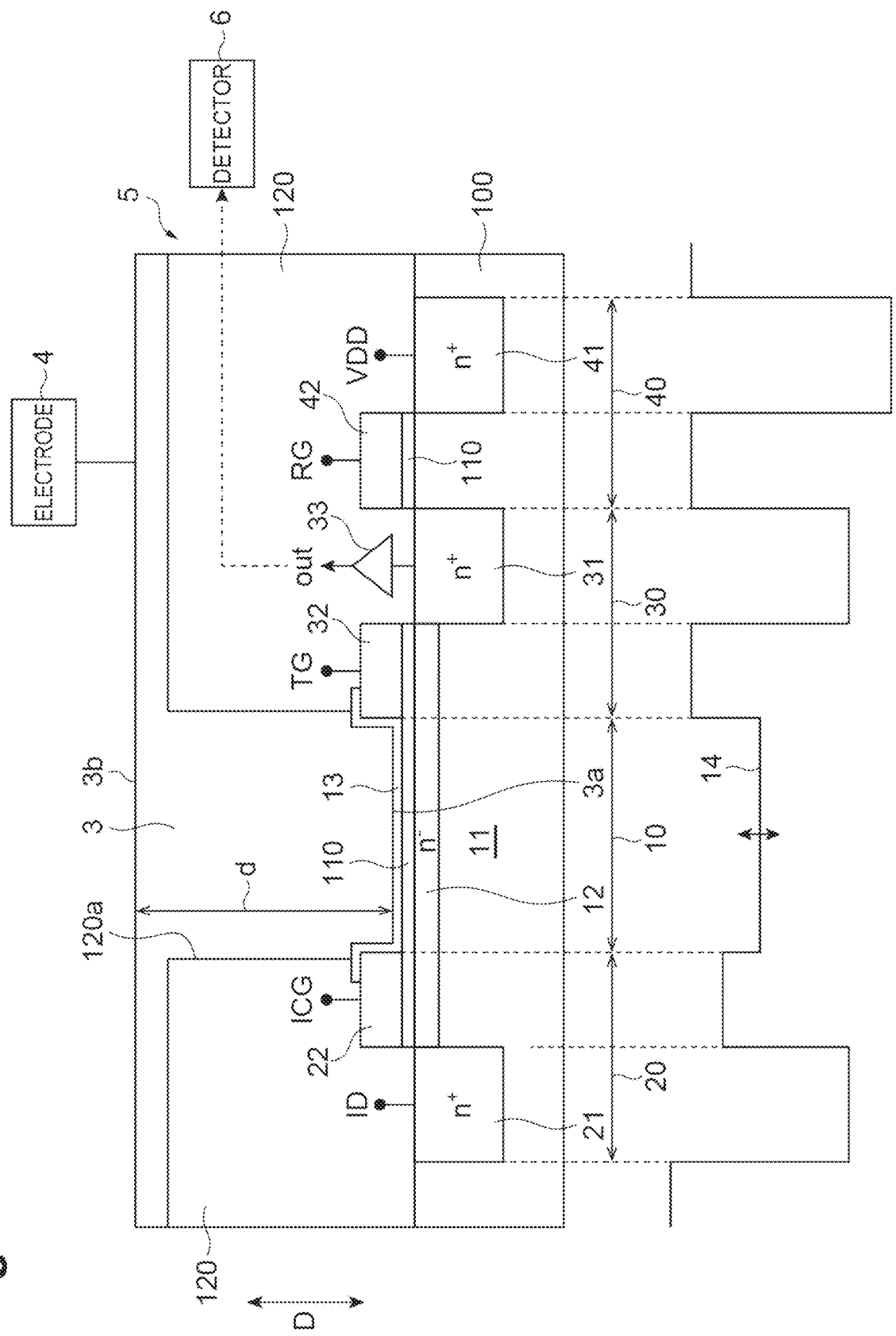
FIG. 2 is a diagram schematically showing a cross-sectional configuration of a detection unit.

The right part of FIG. 1 schematically shows a layout example common to each detection unit 5. FIG. 2 is a view schematically showing a cross-sectional configuration of the detection unit 5 along line II-II in FIG. 1. As shown in the drawings, each detection unit 5 is formed on one main surface side of the semiconductor substrate 100 (a substrate). The semiconductor substrate 100 is a first conductive type (an n-type as an example) semiconductor substrate formed of, for example, silicon. In each detection unit 5, along the main surface of the semiconductor substrate 100, an injection diode portion 21 (hereinafter referred to as an "ID portion 21"), a floating diffusion portion 31 (hereinafter referred to as an "FD portion 31"), and a reset drain portion 41 (hereinafter referred to as an "RD portion 41"), which are each a first conductive type region, are formed. A second conductive type (a p-type as an example) diffusion layer 11 is formed between the ID portion 21 and the FD portion 31 of the semiconductor substrate 100. A first conductive type region 12 doped in a first conductive type is formed on a surface of the diffusion layer 11.

An input control gate electrode 22 (hereinafter referred to as an "ICG electrode 22"), a transfer gate electrode 32 (hereinafter referred to as a "TG electrode 32"), and a reset gate electrode 42 (hereinafter referred to as an "RG electrode 42") are formed on the main surface of the semiconductor substrate 100 via an insulating protective film 110. As the protective film 110, for example, $SiO_2$ or the like can be used. Further, an amplifier (a signal amplifier) 33 that amplifies an out signal according to the amount of charges accumulated in the FD portion 31, and an output circuit 34 that outputs the out signal amplified by the amplifier 33 to the detector 6 are provided on the main surface of the semiconductor substrate 100.

A sensitive film 13 (ion sensitive portion) is provided in a region between the ICG electrode 22 and the TG electrode 32 via the protective film 110. The sensitive film 13 is an ion sensitive film having a property of changing a potential (membrane potential) in accordance with a state of the substance adsorption film 3 disposed on the sensitive film 13. As described above, in the present embodiment, when the substance adsorption film 3 adsorbs the smell substance, the proton is released from the substance adsorption film 3. This changes the ion concentration in the vicinity of the sensitive film 13. The sensitive film 13 changes the potential in accordance with the change of the ion concentration. For example, $Si_3N_4$ or the like may be used as the sensitive film 13.

The sensitive film 13 covers a part of the ICG electrode 22 and the TG electrode 32 so that the ICG electrode 22 and the TG electrode 32 do not come into contact with the substance adsorption film 3. Thus, the sensitive film 13 is integrally formed over the ICG electrode 22 to the TG electrode 32. However, the sensitive film 13 may be provided only between the ICG electrode 22 and the TG electrode 32, or may be formed not to cover a part of the ICG electrode 22 and the TG electrode 32. That is, the sensitive film 13 may be formed only on the protective film 110 between the ICG electrode 22 and the TG electrode 32.

An insulating passivation layer 120 is formed on the main surface of the semiconductor substrate 100 so as to cover these members provided on the main surface of the semiconductor substrate 100. For example, $Si_3N_4$ may be used as the passivation layer 120. The substance adsorption film 3 is provided so as to cover the passivation layer 120. An opening 120a for exposing the upper surface of the sensitive film 13 to the outside is formed in the passivation layer 120. The sensitive film 13 is in contact with the substance adsorption film 3 through the opening 120a. That is, a part of the substance adsorption film 3 enters the inside of the opening 120a, and the inner surface 3a of the substance adsorption film 3 on the semiconductor substrate 100 side is in contact with the sensitive film 13 inside the opening 120a.

The electrode 4 applies a reference voltage to the substance adsorption film 3. The shape, arrangement, and the like of the electrode 4 are not limited to a specific form. For example, the electrode 4 may be a built-in electrode (for example, a metal wiring formed by a CMOS process) disposed inside the substance adsorption film 3. Alternatively, the electrode 4 may be an external electrode (for example, a membrane electrode formed by a MEMS process) disposed along the outer surface 3b (surface opposite to the inner surface 3a) of the substance adsorption film 3. The electrode 4 may be formed of a material capable of being in contact with the substance absorption film 3 and applying a voltage to the substance adsorption film 3. As the electrode 4, for example, Al—Si—Cu or the like may be used.

The detector 6 monitors an output value (in the present embodiment, an out signal described later) in accordance with the potential of the sensitive film 13 from the ion sensor 2. The detector 6 detects the smell substance by detecting a change in the output value in accordance with the potential change of the sensitive film 13. Specifically, according to the hypothesis of the present inventor described later, when the proton is released from the substance adsorption film 3, an amount of cations derived from the proton released from the substance adsorption film 3 increases in the vicinity of the sensitive film 13. Accordingly, the detector 6 can determine that the smell substance is adsorbed by the substance adsorption film 3 when the change in the output value in accordance with the potential change of the sensitive film 13 indicates an increase in the ion concentration in the vicinity of the sensitive film 13 (for example, an increase equal to or greater than a threshold value in a predetermined unit time). The detector 6 may be configured as, for example, a computer device including a processor, a memory, a storage, a communication device, and the like.

Next, the functional configuration and operation principle of the detection unit 5 will be described. The detection unit 5 includes a sensing section 10, a supply section 20, a movement/accumulation section 30, and a removal section 40. In the present embodiment, the charges are electrons.

The sensing section 10 is a region where the sensitive film 13 is exposed to the outside (i.e., to the substance adsorption film 3) through the opening 120a of the passivation layer 120. More specifically, the sensing section 10 is a region where the sensitive film 13 faces the first conductive type region 12 via the protective film 110 between the ICG electrode 22 and the TG electrode 32. That is, the sensing section 10 is a sensing region formed by stacking the diffusion layer 11, the first conductive type region 12, the protective film 110, and the sensitive film 13.

Figure 3:
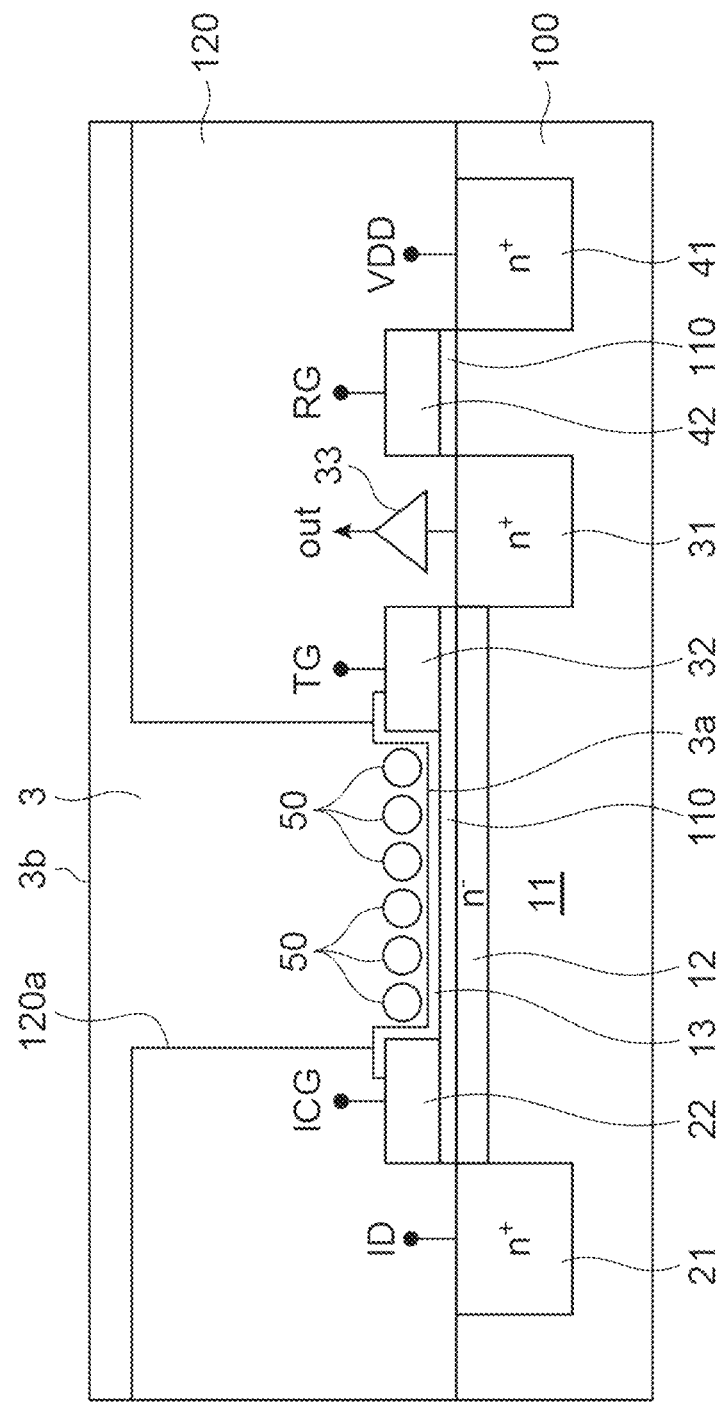
FIG. 3 is a diagram for explaining a hypothesis about a phenomenon occurring when a smell substance is adsorbed to a substance adsorption film.

With reference to FIG. 3, a hypothesis of the present inventor will be described with respect to a phenomenon that occurs when a smell substance is adsorbed to the substance adsorption film 3 on the sensitive film 13. When the substance adsorption film 3 on the sensitive film 13 adsorbs the smell substance to be detected, proton release (deprotonation) from the substance adsorption film 3 occurs. As a result, in the vicinity of the sensitive film 13, the cation 50 due to the proton release is generated and accumulated. Here, the cation 50 is a proton itself released from the substance adsorption film 3 or an ion (for example, an ammonia ion or the like) generated by bonding the proton and the smell substance. As a result, the ion concentration (cation amount) is increased in the vicinity of the sensitive film 13 compared to the state before the smell substance is adsorbed by the substance adsorption film 3. Then, in the sensitive film 13, a potential change corresponding to the increase of the ion concentration occurs. The depth of the potential well 14 of the diffusion layer 11 facing the sensitive film 13 changes in accordance with the potential change of the sensitive film 13.

The supply section 20 includes the ID portion 21 and the ICG electrode 22. The ID portion 21 is a portion for injecting charges into the potential well 14. The ICG electrode 22 is a portion that controls the amount of charges to be injected from the ID portion 21 into the potential well 14. For example, by lowering the potential of the ID portion 21, charges can be supplied to the potential well 14.

The movement/accumulation section 30 includes the TG electrode 32 and the FD portion 31. The TG electrode 32 is a portion for transferring charges from the potential well 14 to the FD portion 31. The FD portion 31 is a portion for accumulating the charges transferred from the potential well 14. Specifically, by changing the voltage of the TG electrode 32, the potential of a region (hereinafter referred to as a "TG region") of the semiconductor substrate 100 facing the TG electrode 32 can be changed, and the charges filled in the potential well 14 can be transferred to and accumulated in the FD portion 31.

The removal section 40 includes an RG electrode 42 and an RD portion 41. The removal section 40 is a portion for resetting (removing) the charges accumulated in the FD portion 31. Specifically, by changing the voltage of the RG electrode 42, the potential of a region (hereinafter, "RG region") facing the RG electrode 42 in the semiconductor substrate 100 can be changed, and the charges accumulated in the FD portion 31 can be discharged to the RD portion 41 (VDD).

Figure 4:
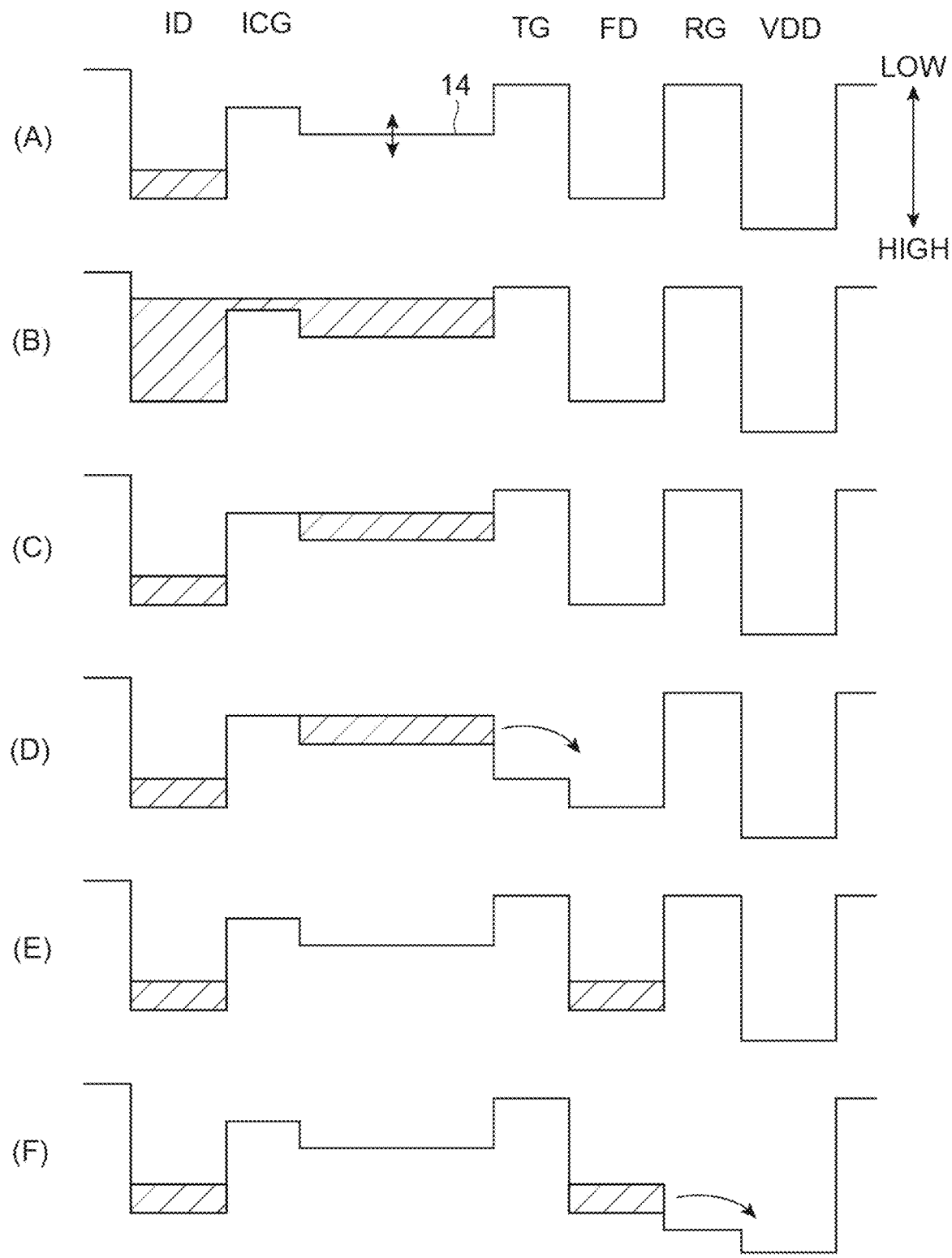
FIG. 4 is a diagram illustrating an example of an operation of the detection unit.

FIG. 4 is a diagram showing an example of a basic operation of the detection unit 5. As shown in (A) of FIG. 4, when the substance adsorption film 3 adsorbs the smell substance and releases the proton, the ion concentration near the sensitive film 13 changes. As a result, the potential of the sensitive film 13 changes, and the depth of the potential well 14 changes in accordance with the potential change. Subsequently, as shown in (B) of FIG. 4, the potential of the ID portion 21 is lowered to charge the ID portion 21. The electric charges charged in the ID portion 21 is injected into the potential well 14 beyond a region (hereinafter, "ICG region") of the semiconductor substrate 100 facing the ICG electrode 22. At this time, the potential of the TG region is controlled to be lower than the potential of the ID portion 21. Therefore, the charges injected into the potential well 14 does not reach the FD portion 31 beyond the TG region.

Subsequently, as shown in (C) of FIG. 4, the potential of the ID portion 21 is returned to the original state (raised), whereby the charges are extracted from the ID portion 21. As a result, the charges cut off at a predetermined potential level of the ICG region remain in the potential well 14. The amount of charges left in the potential well 14 corresponds to the depth of the potential well 14 (i.e., the ion concentration in the vicinity of the sensitive film 13).

Subsequently, as shown in (D) of FIG. 4, the voltage of the TG electrode 32 is raised, so that the charges left in the potential well 14 are transferred to the FD portion 31. Thereafter, the voltage of the TG electrode 32 is returned to the original voltage, and the state shown in (E) of FIG. 4 is obtained. In this state, a signal (out signal) corresponding to the amount of charges accumulated in the FD portion 31 is output to the detector 6 via the amplifier 33 and the output circuit 34. Accordingly, in the detector 6, the smell detected in the substance adsorption film 3 (i.e., the smell substance adsorbed by the substance adsorption film 3) is detected based on the change in the output voltage. Subsequently, as shown in (F) of FIG. 4, the voltage of the RG electrode 42 is raised, whereby the charges accumulated in the FD portion 31 are discharged to the RD portion 41. The RD portion 41 is connected to a VDD power supply. Accordingly, negatively charged charges are sucked into the RD portion 41.

The above-described operations of (B) to (E) of FIG. 4 may be repeated a plurality of times. Accordingly, the amount of charges accumulated in the FD portion 31 can be increased, and the out signal can be amplified by the number of repetitions. Further, the amplifier 33 may be omitted by amplifying the out signal by such a repetitive operation.

Figure 5:
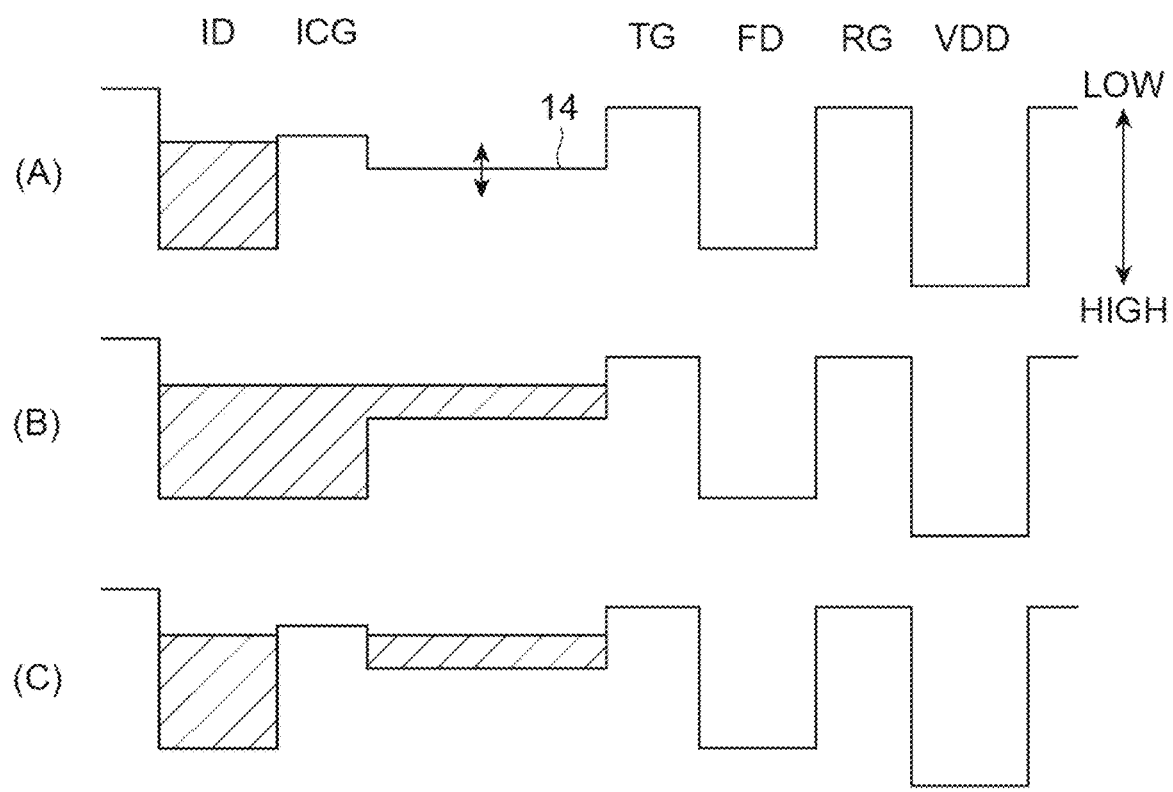
FIG. 5 is a diagram illustrating another example of the operation of the detection unit.

The method of injecting charges into the potential well 14 is not limited to the example of FIG. 4. For example, as shown in FIG. 5, the potential of the ID portion 21 may be kept constant, and the voltage of the ICG electrode 22 may be adjusted to inject the electric charges having the same potential as the ID portion 21 into the potential well 14. Specifically, as shown in (A) of FIG. 5, the potential of the ID portion 21 is set to a constant value lower than the potential of the potential well 14 and higher than the potential of the TG region. On the other hand, the potential of the ICG region is made lower than the potential of the ID portion 21. Subsequently, as shown in (B) of FIG. 5, by making the potential of the ICG region higher than the potential of the potential well 14, charges are supplied from the ID portion 21 to the potential well 14. Subsequently, as shown in (C) of FIG. 5, the potential of the ICG region is set to be lower than the potential of the ID portion 21 again, so that charges up to the preset potential of the ID portion 21 remain in the potential well 14. As a result, electric charges having a potential equivalent to that of the ID portion 21 are accumulated in the potential well 14. The subsequent operations in the example of FIG. 5 are the same as the operations of (D) to (F) of FIG. 4.

Next, the structure of the substance adsorption film 3 will be described. As described above, in order to effectively cause a change in the ion concentration in the vicinity of the sensitive film 13 (in this embodiment, an increase in the cation 50), it is necessary to cause proton release from the substance adsorption film 3 in the vicinity of the sensitive film 13. For this purpose, the smell substance needs to reach the vicinity of the sensitive film 13. Therefore, the substance adsorption film 3 may be formed in a fibrous or porous shape so that the smell substance can pass therethrough. That is, the substance adsorption film 3 may have a structure including an interior space (pore or the like) through which the smell substance can pass, instead of a structure in which the substances are densely packed. In this case, the smell substance can pass through the substance adsorption film 3 and reach the vicinity of the sensitive film 13. That is, the smell substance can be appropriately guided from the outer surface 3b to the inner surface 3a of the substance adsorption film 3. As a result, as shown in FIG. 3, protons can be released from the substance adsorption film 3 in the vicinity of the sensitive film 13, and the sensitive film 13 can suitably sense a change in ion concentration caused by the proton release. As a result, the smell substance can be suitably detected.

Further, the substance adsorption film 3 is preferably as thin as possible. For example, the thickness d of the substance adsorption film 3 in the facing direction D in which the sensitive film 13 and the substance adsorption film 3 face each other (that is, the thickness of the substance adsorption film 3 in the portion overlapping the sensitive film 13) is preferably 5 μm or less. By thinly forming the substance adsorption film 3 on the sensitive film 13, it is possible to make it easy for the smell substance to reach the vicinity of the sensitive film 13. The polyaniline in the emeraldine-salt state contained in the substance adsorption film 3 of the present embodiment is conductive. Here, if the resistance value of the substance adsorption film 3 (that is, the resistance value of the substance adsorption film 3 interposed between the electrode 4 and the sensitive film 13) is too low, there is a possibility that the potential change of the sensitive film 13 (that is, the change from the stable state in which the reference voltage is applied) caused by the change of the ion concentration in the vicinity of the sensitive film 13 cannot be appropriately detected. Therefore, the substance adsorption film 3 interposed between the electrode 4 and the sensitive film 13 preferably has a somewhat high resistance value. From such a viewpoint, it is preferable that the substance adsorption film 3 on the sensitive film 13 is thinly formed so that the thickness d is 5 μm or less.

Figure 6:
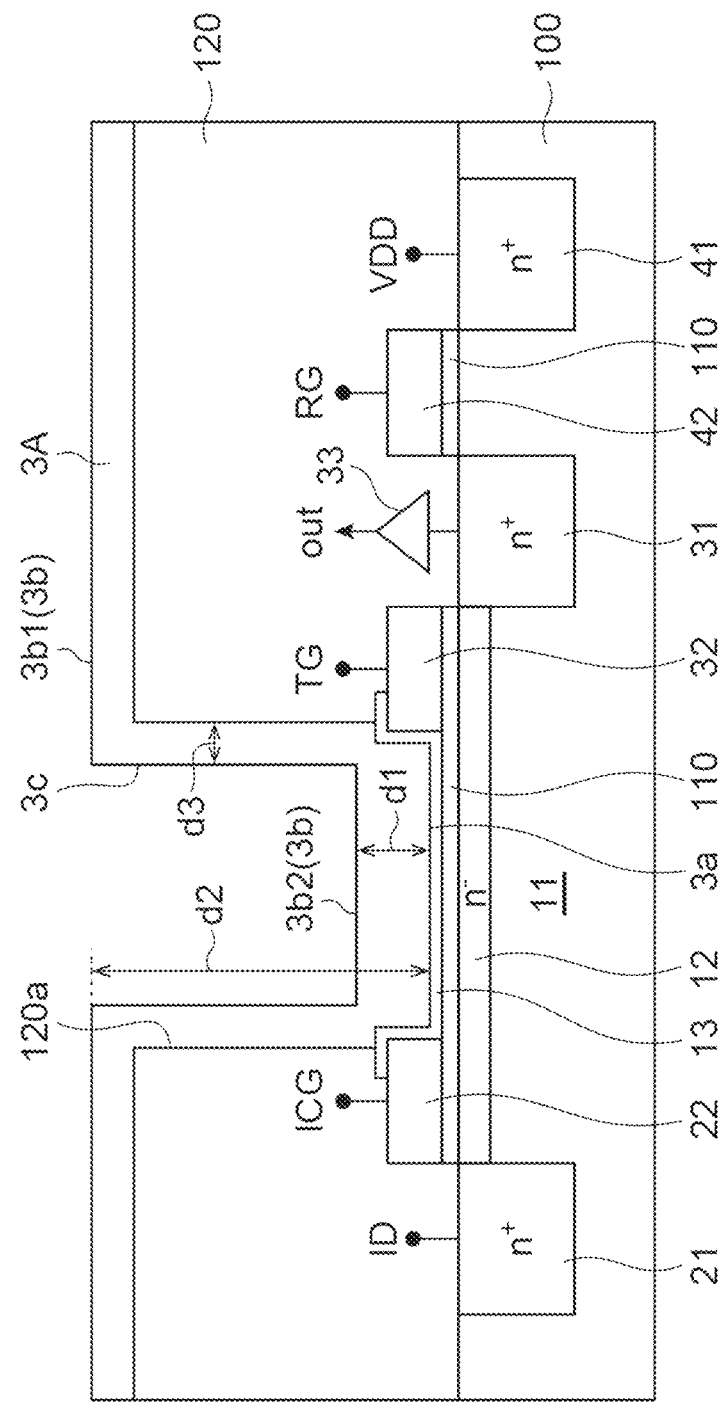
FIG. 6 is a diagram showing a modification of the substance adsorption film.

FIG. 6 is a view showing a modification of the substance adsorption film (substance adsorption film 3A). As shown in FIG. 6, the substance adsorption film 3A is provided along the shape of the opening 120a. In the above-described substance adsorption film 3 (see FIG. 2), since the opening 120a is filled with the substance adsorption film 3, the outer surface 3b of the portion overlapping the opening 120a is flush with the outer surface 3b of the portion not overlapping the opening 120a when viewed from the facing direction D. On the other hand, the substance adsorption film 3A is thinly formed along the shapes of the side surfaces and the bottom surfaces (the surfaces of the sensitive film 13) of the opening 120a. Accordingly, the thickness d1 of the substance adsorption film 3A at the center of the opening 120a when viewed from the facing direction D (i.e., the distance along the facing direction D from the outer surface 3b2 located at the center of the opening 120a to the surface of the sensitive film 13) is smaller than the distance d2 along the facing direction D from the outer surface 3b1 not overlapping the opening 120a to the surface of the sensitive film 13. That is, the substance adsorption film 3A has a depression 3c recessed along the shape of the opening 120a. According to this configuration, when the sensitive film 13 is disposed at a recessed position in the opening 120a of the passivation layer 120, the thickness d1 of the substance adsorption film 3A provided on the sensitive film 13 can be effectively reduced. This makes it easy for the smell substance to reach the vicinity of the sensitive film 13. For example, even when the distance d2 (corresponding to the depth d of the substance adsorption film 3) is larger than 5 μm, the substance adsorption film 3A can be formed so that the depth d1 is 5 μm or less by forming the substance adsorption film 3A along the shape of the opening 120a. In addition, since the substance adsorption film 3A has the depression 3c, the portion of the substance adsorption film 3A disposed on the sensitive film 13 and the portion along the side surface of the opening 120a can be thinned. Accordingly, when a reference voltage is applied from the electrode 4 to a portion (for example, a portion on the passivation layer 120) of the substance adsorption film 3A that does not overlap the opening 120a, the resistance value of the substance adsorption film 3A interposed between the electrode 4 and the sensitive film 13 may be effectively increased. It is also preferable that the thickness d3 of the portion of the substance adsorption film 3A along the side surface of the opening 120a is 5 μm or less, like the portion d1. Accordingly, the resistance value of the substance adsorption film 3A interposed between the electrode 4 and the sensitive film 13 may be more effectively increased.

In the smell sensor 1 described above, the substance adsorption film 3 (or the substance adsorption film 3A) is in a state of releasing proton when the smell substance is adsorbed. Accordingly, when the substance adsorption film 3 adsorbs the smell substance, the sensitive film 13 can sense a change in electrical characteristics caused by the proton release. In addition, since the reference voltage is applied to the substance adsorption film 3 by the electrode 4, a slight change in electrical characteristics from a stable state (that is, a state in which the smell substance is not adsorbed to the substance adsorption film 3 and the reference voltage is applied to the substance adsorption film 3) can be detected by the ion sensor 2. Therefore, according to the smell sensor 1, the smell substance can be suitably detected by utilizing the proton release phenomenon of the substance adsorption film 3. In addition, in the smell detection using the above-described proton release phenomenon, for example, smell substances such as ammonia and nitrogen oxides can be suitably detected.

In the present embodiment, the substance adsorption film 3 is a polyaniline film containing polyaniline in an emeraldine-salt state. According to this configuration, the substance adsorption film 3 that releases a proton when it adsorbs a smell substance can be preferably formed of polyaniline.

In addition, the sensitive film 13 changes the potential in response to a change in the ion concentration in the vicinity of the sensitive film 13 due to the proton release from the substance adsorption film 3. As described above, it is considered that when the substance adsorption film 3 adsorbs the smell substance, the proton release from the substance adsorption film 3 occurs, so that the ion concentration in the vicinity of the sensitive film 13 changes. That is, it is considered that the proton released from the substance adsorption film 3 (or the smell substance ionized by the proton) stays in the vicinity of the sensitive film 13, so that the ion concentration in the vicinity of the sensitive film 13 increases. According to the above configuration, such a change in the ion concentration can be detected as a change in the potential of the sensitive film 13. Furthermore, the change in the ion concentration in the vicinity of the sensitive film 13 tends to occur more reliably than the change in the dielectric constant of the substance adsorption film 3. Therefore, according to the above configuration, the smell substance can be detected more accurately and earlier than in the case where the smell substance is detected based on the change in the relative dielectric constant of the substance adsorption film 3. Further, the detection of the smell substance based on the proton release as in the present embodiment has the following advantages. In order to detect the smell substance based on the change in the relative dielectric constant of the substance adsorption film 3 (that is, in order to cause a significant change in the relative dielectric constant to such an extent that the smell substance can be detected), it is considered that very high accuracy is required for the uniformity of the substance adsorption film 3 on the sensitive film 13. On the other hand, in the case where the smell substance is detected based on the proton release as in the present embodiment, it is considered that the uniformity of the thickness of the substance adsorption film 3 is not required to be as high in accuracy as in the case where the smell substance is detected based on the change in the relative dielectric constant.

The smell sensor 1 includes the detector 6 described above. The smell substance can be immediately detected by the detector 6. When the detector 6 detects a smell substance, the detector 6 may automatically output an alert or transmit a control signal for activating another system (for example, a ventilation system). Accordingly, it is possible to promptly take measures after the smell substance is detected.

Next, a smell detection method using the smell sensor 1 will be described. The detector 6 monitors the output value of the ion sensor 2 in accordance with the potential of the sensitive film 13 in a state where a reference voltage is applied to the substance adsorption film 3 by the electrode 4. When the substance adsorption film 3 adsorbs the smell substance under such monitoring, the proton is released. Subsequently, the sensitive film 13 changes the potential in accordance with the change of the ion concentration in the vicinity of the sensitive film 13 due to the proton release from the substance adsorption film 3. Then, the detector 6 detects a change in the output value of the ion sensor 2 in accordance with the potential change of the sensitive film 13, thereby detecting the smell substance. In the above-described smell detection method, a slight change in electrical characteristics from a stable state in which a reference voltage is applied to the substance adsorption film 3 (change in ion concentration in the vicinity of the sensitive film 13) can be detected by monitoring the output value of the ion sensor 2. Further, when the substance adsorption film 3 adsorbs the smell substance, the proton release from the substance adsorption film 3 occurs, so that the ion concentration in the vicinity of the sensitive film 13 changes. According to the smell detection method, the smell substance can be suitably detected by detecting such a change in the ion concentration based on the output value of the ion sensor 2.

Second Embodiment

Figure 7:
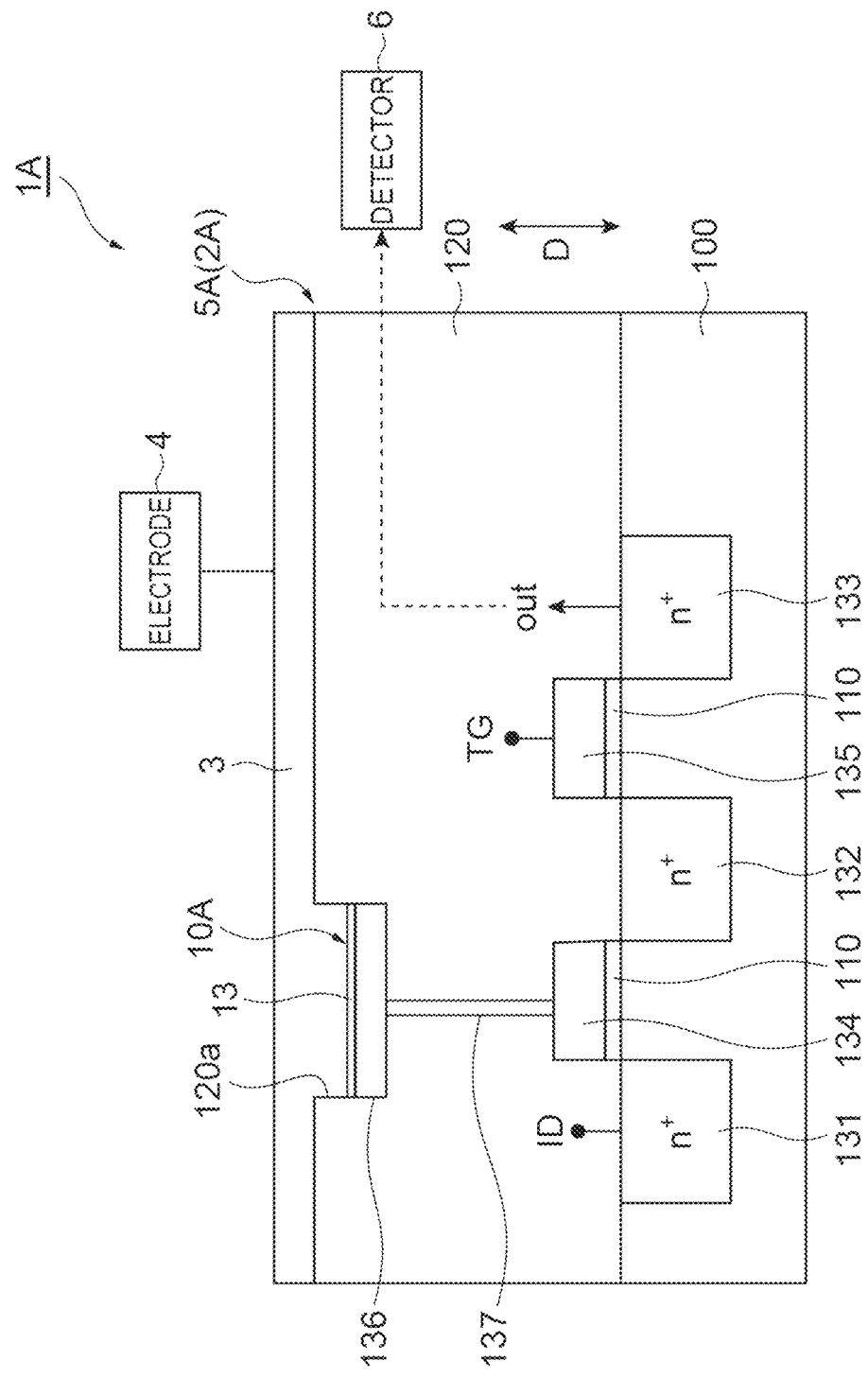
FIG. 7 is a diagram schematically showing a cross-sectional configuration of a detection unit of the smell sensor of a second embodiment.

FIG. 7 is a diagram schematically showing a cross-sectional configuration of the detection unit 5A of the smell sensor 1A of the second embodiment. The smell sensor 1A is different from the smell sensor 1 of the first embodiment in that a so-called ISFET type ion sensor 2A is provided instead of the ion sensor 2 which is a so-called charge transfer type CMOS image sensor. Other configurations of the smell sensor 1A are the same as those of the smell sensor 1. The ion sensor 2A is different from the ion sensor 2 in that a detection unit 5A employing an ISFET type measurement method is provided as a unit detection element instead of the detection unit 5 employing a charge transfer type measurement method.

In the detection unit 5A, three $n^+$ type regions 131 to 133 of a first conductivity type (here, n-type) are formed on one main surface side of the semiconductor substrate 100. Further, two gate electrodes 134 and 135 are formed on the main surface of the semiconductor substrate 100 via an insulating protective film 110. The gate electrode 134 is located between the $n^+$ type region 131 and the $n^+$ type region 132. The $n^+$ type region 131, the $n^+$ type region 132, and the gate electrode 134 constitute a MOS transistor. An ID signal (voltage) is applied to the $n^+$ type region 131 from a control unit (not shown). The gate electrode 135 is located between the $n^+$ type region 132 and the $n^+$ type region 133. ATG signal (voltage) is applied to the gate electrode 135 from a control unit (not shown). The $n^+$ type region 133 is electrically connected to the detector 6. A conductive member 136 on which the sensitive film 13 is placed is electrically connected to the gate electrode 134 via a conductive connecting member 137. A portion where the sensitive film 13 is provided on the conductive member 136 functions as a sensing section 10A. The sensing section 10A is a region where the sensitive film 13 is exposed to the outside (i.e., to the substance adsorption film 3) through an opening 120a of the passivation layer 120, which will be described later. The conductive member 136 has, for example, a rectangular shape having substantially the same size as the sensitive film 13 when viewed from the facing direction D. The sensitive film 13 is formed on an upper surface of the conductive member 136.

Similar to the detection unit 5 of the first embodiment, the insulating passivation layer 120 is formed on the main surface of the semiconductor substrate 100 so as to cover the members provided on the main surface of the semiconductor substrate 100 as described above. The substance adsorption film 3 is provided so as to cover the passivation layer 120. An opening 120a for exposing the upper surface of the sensitive film 13 to the outside is formed in the passivation layer 120. The sensitive film 13 is in contact with the substance adsorption film 3 through the opening 120a. A reference voltage is applied to the substance adsorption film 3 by an electrode 4. In the example of FIG. 7, the upper surface of the sensitive film 13 is located at a position recessed from the upper surface of the passivation layer 120 toward the semiconductor substrate 100, but the sensitive film 13 may be provided such that the upper surface of the sensitive film 13 is continuous with (flatly connected to) a portion of the passivation layer 120 where the opening 120a is not formed.

Next, the operation principle of the detection unit 5A will be described. First, the outline of the operation principle will be described. As in the first embodiment, when the substance adsorption film 3 adsorbs a smell substance and releases a proton, the ion concentration in the vicinity of the sensitive film 13 changes. As a result, the potential of the sensitive film 13 changes, and the potential of the gate electrode 134 electrically connected to the sensitive film 13 changes. The smell detected in the substance adsorption film 3 (i.e., the smell substance adsorbed by the substance adsorption film 3) is detected based on the change in the current or voltage of the signal (out signal) in accordance with the potential change of the gate electrode 134. Hereinafter, first to third examples of the operation (driving method) of the detection unit 5A will be described. However, as a method of driving the detection unit 5A, a method other than these examples may be used.

First Example

A first example is a commonly employed driving scheme in an ISFET. The first example is a driving method based on a phenomenon that the magnitude of the current flowing between the $n^+$ type region 131 and the $n^+$ type region 132 changes in accordance with the change in the potential of the gate electrode 134 described above. That is, when the potential of the gate electrode 134 changes in accordance with the change of the ion concentration near the sensitive film 13 caused by the proton release from the substance adsorption film 3, the magnitude of the current flowing between the n⁺ type region 131 and the n⁺ type region 132 is changed. Here, the gate electrode 135 is used as a switch, and the switch is turned on by changing the TG signal applied to the gate electrode 135. That is, the charges of the n⁺ type region 132 is switched to a state of flowing into the n⁺ type region 133 through a region (hereinafter, referred to as a "TG region") facing the gate electrode 135. Accordingly, a current flowing between the n⁺ type region 131 and the n⁺ type region 132 is output as an out signal through the TG region and the n⁺ type region 133. Thereafter, for example, the out signal is converted into a voltage in the detector 6. As a result, the proton release from the substance adsorption film 3 (i.e., the adsorption of the smell substance by the substance adsorption film 3) is detected based on the voltage change of the out signal.

Second Example

In the second example, the ID signal supplied to the n⁺ type region 131 is changed in a state where the switch of the gate electrode 135 is turned ON, and thus the charges are injected into the n⁺ type region 131. Thereafter, the injection of charges into the n⁺ type region 131 is stopped, and the voltage of the out signal when the injection of charges is stopped is monitored by the detector 6. As a result, in the detector 6, the proton release from the substance adsorption film 3 (that is, the adsorption of the smell substance by the substance adsorption film 3) is detected based on the voltage change of the out signal.

Third Example

Schematically, the third example is a method in which a region of the semiconductor substrate 100 facing the gate electrode 134 (hereinafter, referred to as a "gate region") is caused to function as the ICG region in the charge transfer type detection unit 5 described above, and the n⁺ type region 132 is caused to function as the FD portion 31 in the detection unit 5. The third example will be described in detail with reference to FIG. 8. As shown in (A) of FIG. 8, the depth of the potential well of the gate region changes in accordance with the potential change of the sensitive film 13. As shown in (B) of FIG. 8, the potential of the n⁺ type region 131 ("ID" in FIG. 8) is lowered by controlling the ID signal. Accordingly, the n⁺ type region 131 is charged. The charges charged in the n⁺ type region 131 are injected into the n⁺ type region 132 beyond the gate region. At this time, the potential of the TG region is controlled to be lower than the potential of the n⁺ type region 131. Therefore, the charges injected into the n⁺ type region 132 do not reach the n⁺ type region 133 ("out" in FIG. 8) beyond the TG region.

Figure 8:
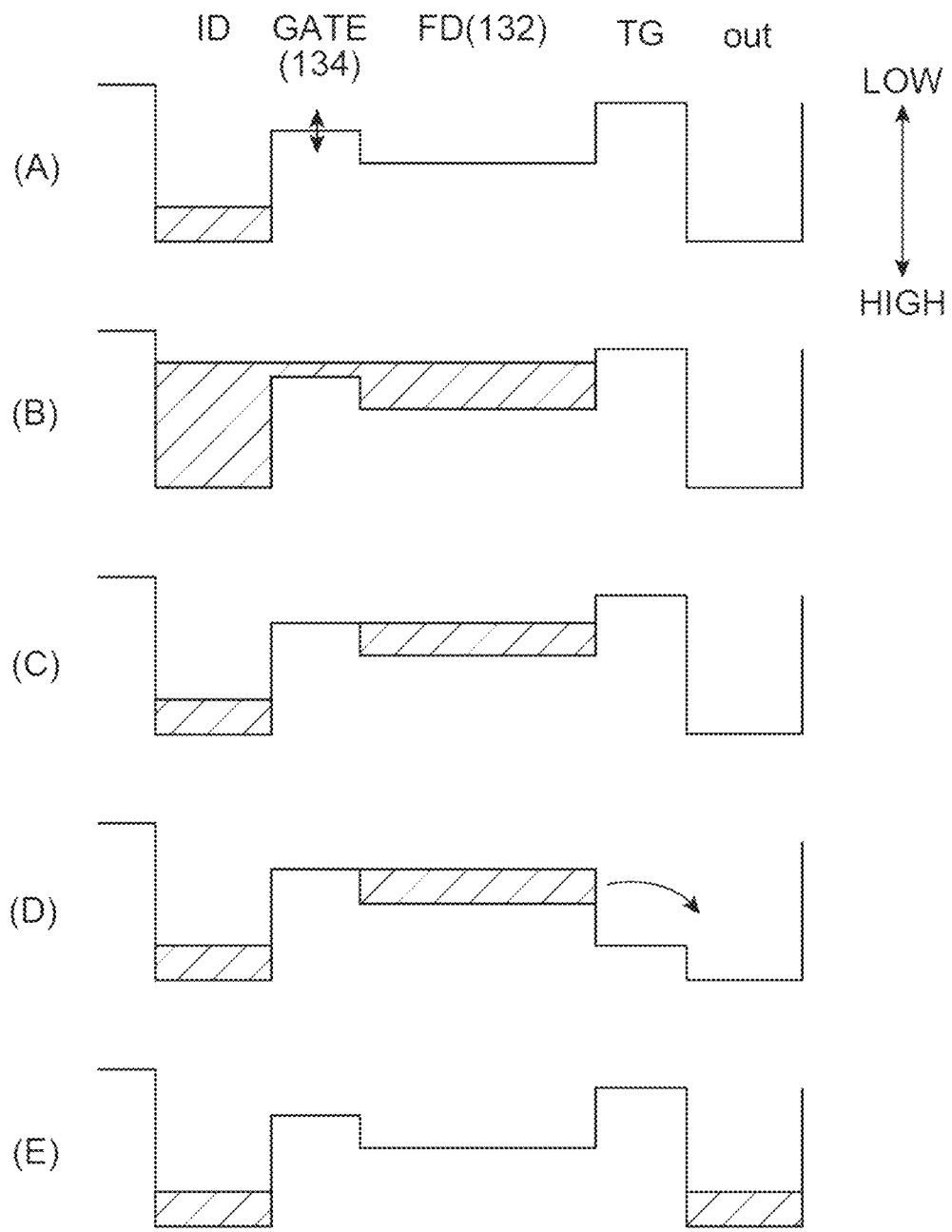
FIG. 8 is a diagram showing a third example of the operation of detection unit 5A shown in FIG. 7.

Subsequently, as shown in (C) of FIG. 8, the potential of the n⁺ type region 131 is returned to the original state (raised), whereby the charges are extracted from the n⁺ type region 131. As a result, the charges scooped by the gate region remain in the n⁺ type region 132. The amount of charges left in the n⁺ type region 132 corresponds to the depth of the potential well of the gate region (i.e., the impedance change of the substance adsorption film 3).

Subsequently, as shown in (D) of FIG. 8, the voltage of the gate electrode 135 is raised, so that the charges left in the n⁺ type region 132 are transferred to the n⁺ type region 133. After that, the voltage of the gate electrode 135 is returned to the original voltage, so that the state shown in (E) of FIG. 8 is obtained. In this state, a signal corresponding to the amount of charges accumulated in the n⁺ type region 133 (i.e., a signal corresponding to the potential of sensitive film 13) is output as an out signal to the detector 6.

As described above, the smell sensor 1A having the ion sensor 2A provided with the detection unit 5A as a unit detection element also achieves the same effect as the smell sensor 1 described above.

Third Embodiment

Figure 9:
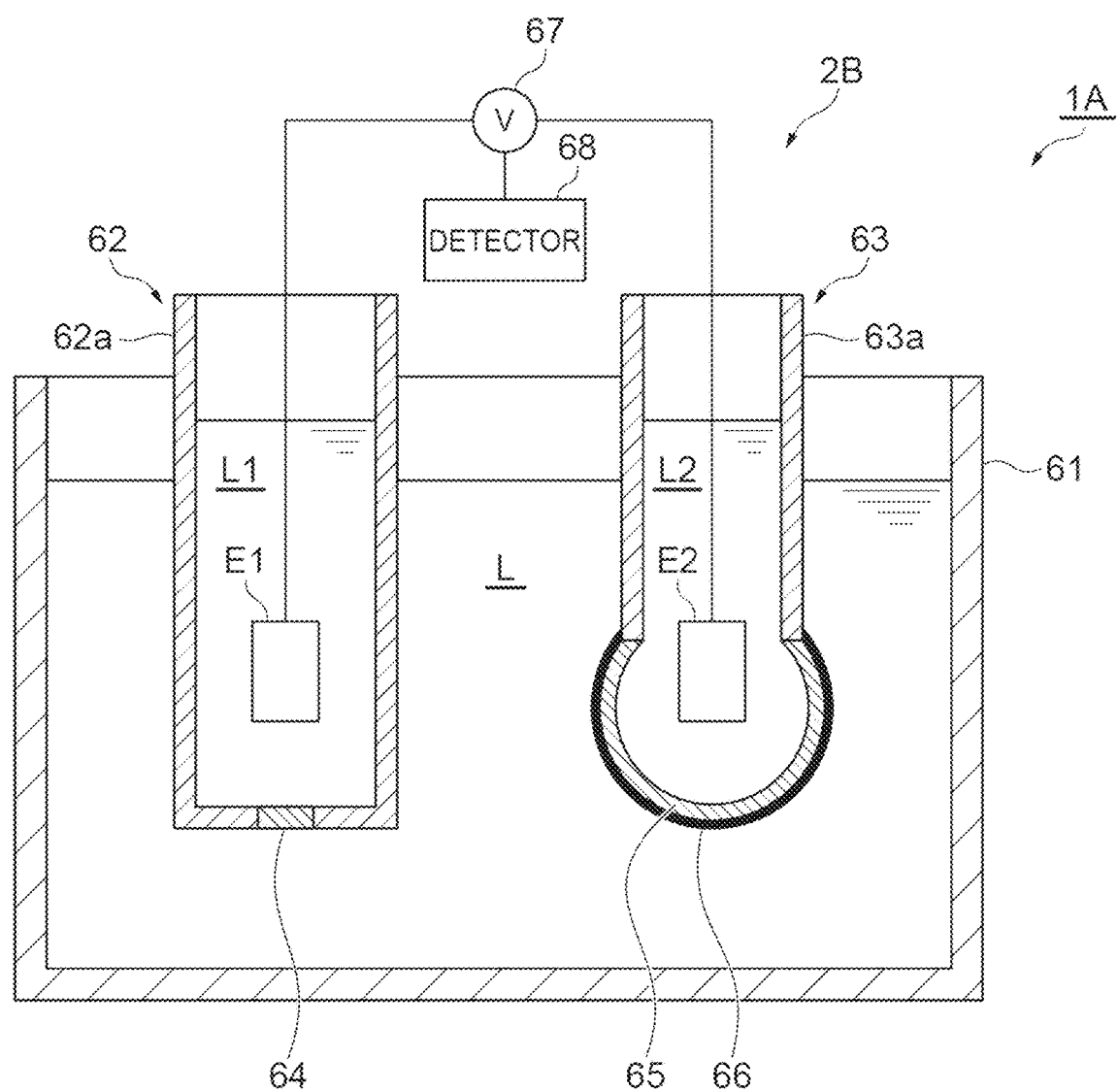
FIG. 9 is a diagram showing a schematic configuration of a smell sensor of a third embodiment.

FIG. 9 is a diagram illustrating a schematic configuration of a smell sensor 1B of the third embodiment. The smell sensor 1B has an ion sensor 2B to which a so-called glass electrode type ion meter is applied. In FIG. 9, a container 61 holds a test solution L to be tested. The ion sensor 2B includes a comparison electrode 62 and a glass electrode 63. The comparison electrode 62 has a container 62a for holding the internal solution L1. An internal electrode E1 is disposed in the internal solution L1. The container 62a is provided with a liquid junction 64 for electrically contacting the internal solution L1 and the test solution L. The glass electrode 63 has a container 63a for holding the internal solution L2. An internal electrode E2 is disposed in the internal solution L2. A glass membrane 65 (ion sensitive portion) is provided at a distal end of the container 63a. A substance adsorption film 66 is provided on the glass membrane 65 (outer surface of the glass membrane 65). The substance adsorption film 66 is a film material similar to the substance adsorption film 3 described above. That is, the substance adsorption film 66 adsorbs a smell substance to be detected (smell substance that may be present or mixed in the test solution L). Further, the substance adsorption film 66 is in a state of releasing a proton when it adsorbs a smell substance to be detected. The substance adsorption film 66 is, for example, a polyaniline film containing polyaniline in an emeraldine-salt state.

The glass membrane 65 generates electromotive force in accordance with the ion concentration (hydrogen ion concentration) of the test solution L. In this embodiment, a substance adsorption film 66 is formed on the outer surface of the glass membrane 65. Therefore, when the substance adsorption film 66 adsorbs the smell substance and releases the proton, the ion concentration changes in the vicinity of the glass membrane 65. That is, the glass membrane 65 changes its potential in accordance with a change in ion concentration in the vicinity of the glass membrane 65 caused by proton release from the substance adsorption film 66. The test solution L is in electrical contact with the internal solution L1 via the liquid junction 64. Therefore, the internal electrode E1 can function as an electrode for applying a reference voltage to the substance adsorption film 66 through the internal solution L1 and the test solution L. Alternatively, the reference voltage may be applied to the substance adsorption film 66 by bringing a metal wiring into direct contact with the substance adsorption film 66. In this case, the metal wiring functions as an electrode for applying a reference voltage to the substance adsorption film 66. Such a metal wiring may be provided along the container 63a of the glass electrode 63 or may be provided as a separate system from the glass electrode 63.

The potential generated outside the glass membrane 65 (test solution L) is measured by the internal electrode E1 of the comparison electrode 62, and the potential generated inside the glass membrane 65 (internal solution L2) is measured by the internal electrode E2 of the glass electrode 63. Specifically, the potential difference between the outside of the glass membrane 65 and the inside of the glass membrane 65 is measured by the voltmeter 67 connected to the internal electrode E1 and the internal electrode E2. That is, the measurement value of the voltmeter 67 is obtained as the output value of the ion sensor 2B. The smell sensor 1B includes a detector 68 that monitors the measurement value of the voltmeter 67. As described above, when the substance adsorption film 66 adsorbs the smell substance and releases the proton, the ion concentration in the vicinity of the glass membrane 65 changes (increases) due to the release of the proton from the substance adsorption film 66. The glass membrane 65 changes its potential in accordance with the change in the ion concentration. The detector 68 detects the smell substance in the test solution L by detecting a change in the measurement value of the voltmeter 67 in accordance with the potential change of the glass membrane 65.

As described above, the smell sensor 1B having the ion sensor 2B in which the substance adsorption film 66 is formed on the outer face of the glass membrane 65 of the so-called glass electrode type ion meter also exhibits the same effect as the above-described smell sensor 1.

Although the preferred embodiments of the present disclosure have been described in detail, the present disclosure is not limited to the above embodiments. For example, in the ion sensors 2A and 2B, the plurality of sensing sections (detection units) may be arranged two-dimensionally or may be arranged one-dimensionally. The ion sensor may include only one sensing sections (detection unit).

In the first embodiment and the second embodiment, the semiconductor substrate 100 is used as the substrate on which the sensing section 10 is formed. However, the substrate on which the sensing section 10 is formed is not necessarily a semiconductor substrate, and may be, for example, a substrate other than a semiconductor on which a semiconductor region (for example, a semiconductor film or the like) is formed.

Figure 10:
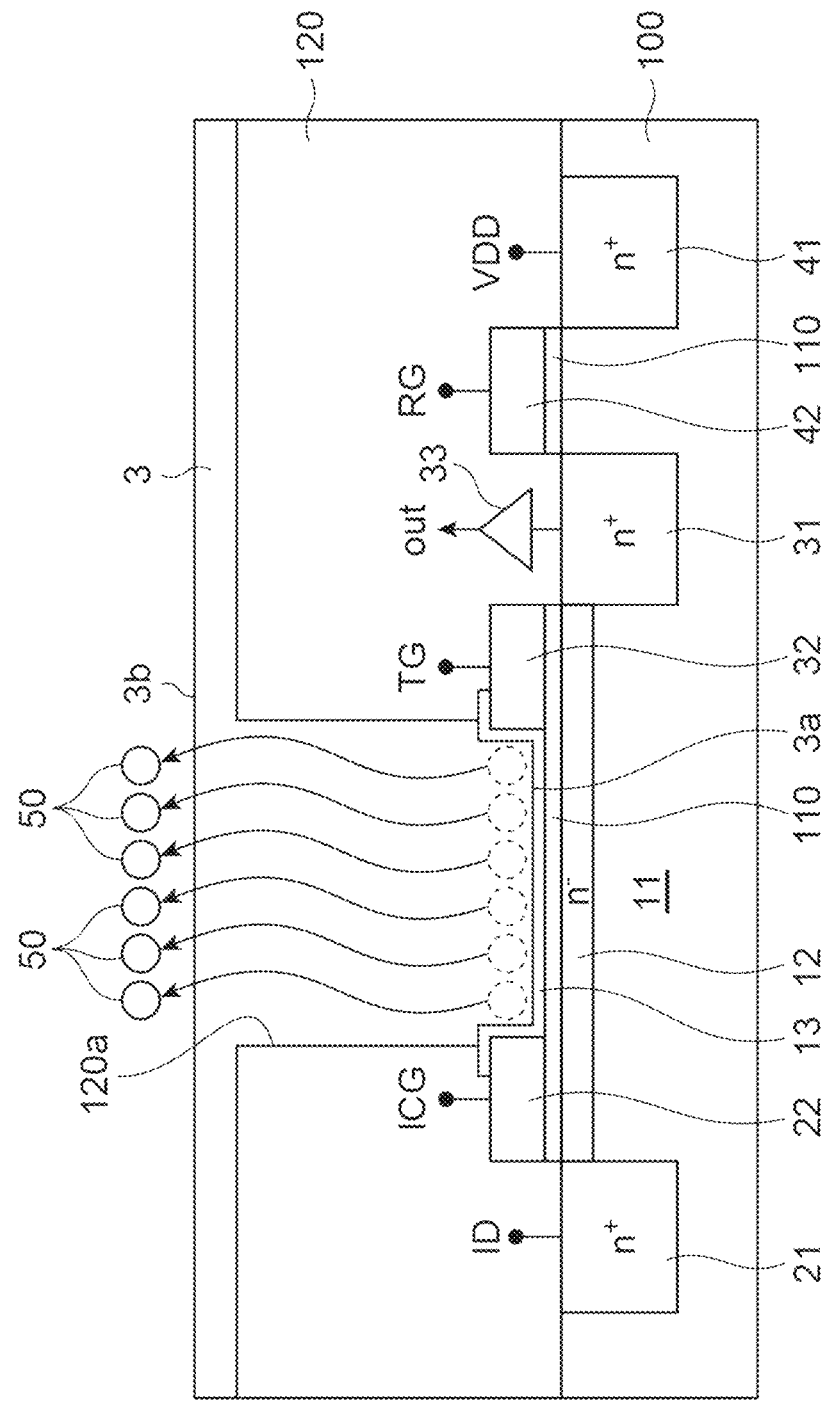
FIG. 10 is a diagram for explaining another hypothesis about a phenomenon occurring when a smell substance is adsorbed to a substance adsorption film.

In addition to the hypothesis described above (i.e., the hypothesis that a cation caused by a proton released from the substance adsorption film 3 stays in the vicinity of the sensitive film 13 to change the ion concentration in the vicinity of the sensitive film 13), the following hypothesis may be considered for the phenomenon that occurs when the substance adsorption film 3 adsorbs the smell substance. That is, as shown in FIG. 10, it is also assumed that the cation 50 caused by the proton released from the substance adsorption film 3 is released to the outside (outer surface 3b side) of the substance adsorption film 3 without staying in the vicinity of the sensitive film 13. Even if such a hypothesis is correct, the smell substance can be suitably detected by using the substance adsorption film 3 which is in a state of releasing a proton when the smell substance is adsorbed. The reason is as follows. That is, when the substance adsorption film 3 on the sensitive film 13 adsorbs the smell substance and releases the proton, a state change of the substance adsorption film 3 occurs in the vicinity of the sensitive film 13. That is, as described above, polyaniline in an emeraldine-salt state is changed to an emeraldine-base state by releasing a proton. As a result, the sensitive film 13 changes its potential in accordance with the change in state of the substance adsorption film 3 in the vicinity of the sensitive film 13. As described above, even if the latter hypothesis is correct, the proton release from the substance adsorption film 3 can be detected as the potential change of the sensitive film 13.

REFERENCE SIGNS LIST 1, 1A, 1B smell sensor
2, 2A, 2B ion sensor
3, 3A, 66 substance adsorption film
4 electrode
13 sensitive film (ion sensitive portion)
65 glass membrane (ion sensitive portion)
120 passivation layer
120a opening

The invention claimed is:

1. A smell sensor comprising:
an ion sensor including an ion sensitive portion;
a substance adsorption film disposed on the ion sensitive portion and configured to adsorb a smell substance to be detected; and
an electrode configured to apply a reference voltage to the substance adsorption film,
wherein the substance adsorption film is in a state of releasing a proton in response to adsorbing the smell substance, and
wherein the substance adsorption film includes polyaniline in an emeraldine-salt state.

2. The smell sensor according to claim 1,
wherein the ion sensitive portion is configured to change a potential of the ion sensitive portion in response to a change in ion concentration in a vicinity of the ion sensitive portion due to proton release from the substance adsorption film.

3. The smell sensor according to claim 2,
further comprising a detector configured to detect the smell substance by monitoring an output value of the ion sensor in accordance with a potential of the ion sensitive portion and detecting a change in the output value of the ion sensor in accordance with a potential change of the ion sensitive portion.

4. The smell sensor according to claim 1,
wherein the substance adsorption film is fibrous or porous.

5. The smell sensor according to claim 1,
wherein a thickness of the substance adsorption film in a facing direction in which the ion sensitive portion and the substance adsorption film face each other is 5 μm or less.

6. The smell sensor according to claim 1,
further comprising a passivation layer provided to cover the ion sensor,
wherein the substance adsorption film is provided to cover the passivation layer,
wherein the passivation layer is provided with an opening exposing the ion sensitive portion to the outside,
wherein the ion sensitive portion is in contact with the substance adsorption film through the opening, and
wherein the substance adsorption film is provided along a shape of the opening.

7. A smell sensing method using a smell sensor comprising an ion sensor including an ion sensitive portion and a substance adsorption film disposed on the ion sensitive portion and configured to adsorb a smell substance to be detected, wherein the substance adsorption film includes polyaniline in an emeraldine-salt state, comprising:
a step of monitoring an output value of the ion sensor in accordance with a potential of the ion sensitive portion in a state where a reference voltage is applied to the substance adsorption film;
a step in which the substance absorption film releases a proton in response to adsorbing the smell substance;
a step in which the ion sensitive portion changes a potential of the ion sensitive portion in response to a change in ion concentration in a vicinity of the ion sensitive portion due to proton release from the substance adsorption film; and a step of detecting the smell substance by detecting a change in an output value of the ion sensor in accordance with a potential change of the ion sensitive portion.

8. A smell sensing method using a smell sensor comprising an ion sensor including an ion sensitive portion and a substance adsorption film disposed on the ion sensitive portion and configured to adsorb a smell substance to be detected, wherein the substance adsorption film is fibrous or porous, comprising:

a step of monitoring an output value of the ion sensor in accordance with a potential of the ion sensitive portion in a state where a reference voltage is applied to the substance adsorption film;

a step in which the substance absorption film releases a proton in response to adsorbing the smell substance;

a step in which the ion sensitive portion changes a potential of the ion sensitive portion in response to a change in ion concentration in a vicinity of the ion sensitive portion due to proton release from the substance adsorption film; and a step of detecting the smell substance by detecting a change in an output value of the ion sensor in accordance with a potential change of the ion sensitive portion.

9. A smell sensor comprising:

an ion sensor including an ion sensitive portion;

a substance adsorption film disposed on the ion sensitive portion and configured to adsorb a smell substance to be detected; and an electrode configured to apply a reference voltage to the substance adsorption film, wherein the substance adsorption film is in a state of releasing a proton in response to adsorbing the smell substance, and wherein the substance adsorption film is fibrous or porous.

10. The smell sensor according to claim 9, wherein the ion sensitive portion is configured to change a potential of the ion sensitive portion in response to a change in ion concentration in a vicinity of the ion sensitive portion due to proton release from the substance adsorption film.

11. The smell sensor according to claim 10, further comprising a detector configured to detect the smell substance by monitoring an output value of the ion sensor in accordance with a potential of the ion sensitive portion and detecting a change in the output value of the ion sensor in accordance with a potential change of the ion sensitive portion.

12. The smell sensor according to claim 9, wherein a thickness of the substance adsorption film in a facing direction in which the ion sensitive portion and the substance adsorption film face each other is 5 μm or less.

13. The smell sensor according to claim 9, further comprising a passivation layer provided to cover the ion sensor, wherein the substance adsorption film is provided to cover the passivation layer, wherein the passivation layer is provided with an opening exposing the ion sensitive portion to the outside, wherein the ion sensitive portion is in contact with the substance adsorption film through the opening, and wherein the substance adsorption film is provided along a shape of the opening.

* * * * *